Oct. 22, 1957 M. HEUPGEN 2,810,669

METHOD OF MAKING ELECTRICAL CABLES

Filed Dec. 21, 1953

2,810,669

METHOD OF MAKING ELECTRICAL CABLES

Marcel Heupgen, Jeumont, France, assignor to Forges et Ateliers de Constructions Electriques de Jeumont, Paris, France, a corporation of France Application December 21, 1953, Serial No. 399,259

Claims priority, application France December 30, 1952

4 Claims. (Cl. 154—2.28)

This invention relates to electric cables, and more particularly to cables which are resistant to mechanical shock, and to a novel method of manufacturing such cables.

To provide protection against mechanical shock, electric cables have heretofore been provided with a sheath of either metallic or non-metallic material. A common material used for this purpose is lead. To provide additional protection, which is necessary in such places as mines where cables are subject to friction, mechanical impact and fire, this sheath has been provided with additional reinforcement in the form of galvanized wires helically wound directly on the sheath. It has been found, however, that this type of reinforcement is subject to rupture, that the reinforcing wires are often insufficiently galvanized to prevent corrosion, and that the sheath is also insufficiently protected against corrosion.

Previous attempts to eliminate these defects have not been successful. One method of reducing the effects of corrosion has been to coat the wire with plastic material before winding it directly on the sheath, but this does not eliminate the effects of mechanical shock which may break the plastic protective coating, providing an entry for moisture and other chemicals and resulting in corrosion of the reinforcing wire and the cable sheath. Even if the wires are further reinforced by fastening with rings or hoops at spaced intervals, these drawbacks are not eliminated; in fact, the danger of rupture is greater because the outer surface is not smooth.

It is a principal object of this invention to provide an electric cable having a novel reinforcing means thereon which will substantially eliminate, or at least greatly reduce, the hazards above mentioned.

It is a further object of this invention to provide a novel and improved method for making such a cable.

In accordance with this invention, the cable sheath is provided with an outer reinforcing sheath or covering comprising flexible plastic material having a smooth outer surface and an inner surface in intimate contact with the sheath, and having completely embedded therein metallic reinforcing means, preferably in the form of one or more wire helices, the turns of which are held out of contact with each other as well as out of contact with the surface of the underlying sheath and the outer atmosphere. This plastic material is preferably inflammable, chemically resistant, and impermeable by water and gases.

In accordance with another feature of the invention, the reinforcing sheath is made by first depositing a layer of the plastic material on the cable sheath, preferably by extrusion, then tightly winding one or more coils of the metallic reinforcing wire over this layer, preferably while it is in a soft state so that the coils are at least partially embedded therein. Finally another layer is deposited over the wire layer so that it completely covers it, fills the spaces between the turns of the coil and holds them separated, and substantially fuses with the underlying layer of plastic, whereby a solid covering having the reinforcing coil completely embedded therein covers the lead sheath. The outer surface of this covering is made smooth and hard thereby rendering it resistant to abrasion, tearing, and mechanical shock.

For a more detailed description of preferred embodiments of the invention, together with other and further objects thereof, reference is made to the following description, taken in the accompanying drawing, wherein.

Figure 1:
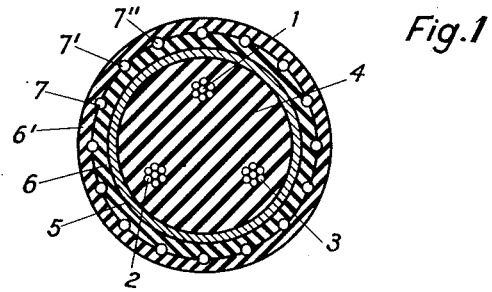
Fig. 1 is a transverse section of a cable according to a preferred embodiment of the invention.

Fig. 1 shows in section a cable comprising several stranded conductors 1, 2, and 3, embedded in suitable insulating material 4, which may be dry or impregnated with an insulating liquid. The whole is covered with a protective sheath 5 which may, for example, be of lead. As thus far described the structure is conventional.

In accordance with the present invention, sheath 5 is covered by a continuous outer protective and reinforcing envelope 6—6' of a flexible material, preferably of the type which may be formed by extrusion by means of so-called "extruders." It may, for example, be a thermoplastic resin such as neoprene etc., having suitable rubber-like qualities. In general, it should be of a substance which is sufficiently flexible, non-inflammable, resistant to wear, abrasion, and mechanical shock, and impermeable to gases and water. The envelope is formed so that its outer surface is smooth and continuous.

Completely embedded within the envelope 6—6' is a metallic reinforcing layer, preferably comprising one or more helices of wire such as 7, 7', 7'', etc. coiled about, but not touching the sheath 5 of the cable. The helices are interwound so that the turns of one helix are situated between the turns of the adjacent ones. The envelope 6—6' is sufficiently thick so that the turns of the helices are neither in contact with sheath 5 nor with the outer atmosphere. The turns of the helices are sufficiently spaced so that they do not touch one another. Preferably the spacing is greater than the diameter of the wire. With this type of arrangement, the wire turns are completely protected against chemical attack and wear and tear. It also provides sufficient damping of external, mechanical impacts. If layer 6' is accidentally pierced as a result of a violent shock, the damage will remain localized because water cannot spread along the cable.

The protective envelope is shown as consisting of two distinct layers for the purpose of illustrating the method of making the cable to be hereinafter described. Actually, in the finished cable, the two layers are so fused together that they in effect form one solid wall which is substantially homogeneous in cross section.

Figure 2:
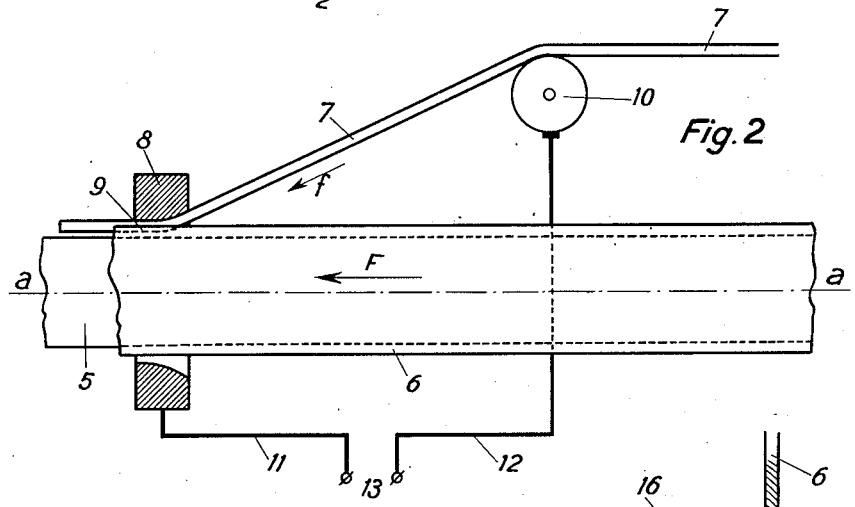
Fig. 2 is a simplified diagram illustrating one stage of the improved method of making the invention.
Figure 3:
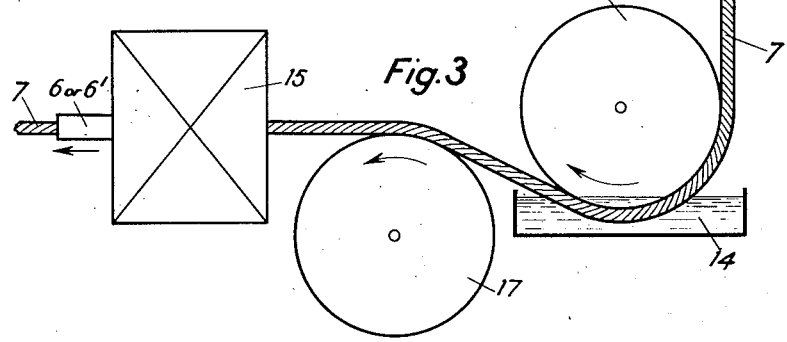
Fig. 3 is a simplified diagram of the final stage of the method.

Reference is now made to Figs. 2 and 3 which illustrate two stages in a preferred method of forming the protective coating on the cable.

First the cable is passed through an extruder such as 15 in Fig. 3 to deposit on the surface of sheath 5 a first plastic layer 6 of the protective envelope. The cable thus treated is then pulled through a dieblock 8 together with one or more wires such as 7 which are drawn from reels over guide rolls 10. To simplify the drawing only one of the wires and one guide roll are shown. Arrows F and f respectively indicate the direction of travel of the cable and wire.

The inner diameter of dieblock 8 is greater than the outer diameter of layer 6 of the cable, but less than this outer diameter plus that of wire 7. Since layer 6 is composed of deformable material, the dieblock causes the wires 7 to be partially embedded within the layer 6. If the material of layer 6 is thermoplastic, the embedding of wire 7 may be facilitated by heating the wire, as by means of an electric current from a source connected to terminals 13, through wires 11 and 12, respectively connected to dieblock 8 and guide roll 10.

By rotating the dieblock 8 and the wires and feed elements 7 and 10 about the axis a—a of the cable, and feeding the wires at a suitable angle with respect to the axis of the cable, the embedded wires 7 takes the form of a helix, the pitch of which is determined by the wire-feed angle. This angle is so chosen that the adjacent turns of the helices do not touch each other.

The final step of the process is illustrated in Fig. 3. The cable, after it has gone through the process illustrated in Fig. 2, is guided by means of a guide roll 16 through a bath or furnace 14 designed to soften the outer surface of layer 6 and make it tacky. It is then fed over another guide roll 17 through an extruder 15 which deposits the second layer of plastic material 6' over the cable. Since the turns of wire are not contiguous, the plastic material of layer 6' is forced between the turns of wire 7 and into intimate contact with the surfaces of said wires and with layer 6. By fushion, polymerization, vulcanization, etc., the two layers 6 and 6' are fused together so that, in effect, they form a single envelope in the wall of which the reinforcing wires 7, 7', etc., are completely embedded and hermetically sealed.

Figure 4:
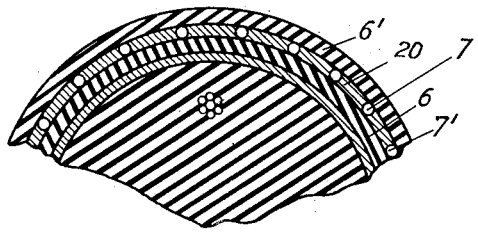
Fig. 4 is a fragmentary transverse section of a cable illustrating a variation of the invention.

Numerous modifications of the invention are possible. The number of fractional layers of plastic and reinforcing wire may be increased. Instead of embedding the wires into layers 6 and 6', the protective envelope may be made as illustrated in Fig. 4. Here the wire 7 is wound over layer 6 without being embedded therein. Between the turns of wires 7, 7' are wound coils of a plastic strip material 20 having a thickness approximately equal to the wire diameter. The layer 6' is then extruded over the wires 7, 7' and the coils 20. The material of strip 20 adheres to the surfaces of layers 6 and 6' and binds them together. It may also be forced into intimate contact with the entire wire surface and thus hermetically seal them and hold them in spaced relationship.

While there have been described several preferred embodiments of the invention, numerous changes may be made without departing from the true spirit and scope of the invention as defined in the appended claims.

What I claim and desire to secure by Letters Patent is:

1. The method of protecting and reinforcing an electric cable with a reinforcing wire and a hermetically sealed elastic envelope sealing the wire and the cable comprising, depositing a first layer of elastic elastomer material on said cable in intimate contact with the surface thereof, said elastomer material having the characteristic of being able to hermetically bond itself one layer upon another, winding helically and fixing upon said first layer at least one reinforcing wire having spaced convolutions, said wire being heated prior to fixing it on said first layer for embedding partially said convolutions in said first layer thereby to fix said convolutions in spaced relationsip, depositing a second layer of elastomer material over said first layer and wire and hermetically bonding said two layers between said convolutions to form a single sealed envelope hermetically sealing and protecting said reinforcing wire and said cable.

2. The method of protecting and reinforcing an electric cable with a reinforcing wire and a hermetically sealed elastic envelope sealing the wire and the cable comprising, extruding a first layer of elastomer material on said cable in intimate contact with the surface thereof, said elastomer material having the characteristic of being able to molecularly bond itself one layer upon another, winding helically and fixing upon said first layer reinforcing wires forming coils having a selected fixed spaced relationship, and prior to winding said wires on said first layer heating them electrically for embedding partially said spaced coils in said elastomer material, extruding a second layer of elastomer material over the first layer and said wire coils and molecularly bonding said two layers between said coils to form a single sealed envelope hermetically sealing and protecting said reinforcing wires and said cable.

3. The method of protecting and reinforcing an electric cable with a reinforcing wire and a hermetically sealed elastic envelope sealing the wire and the cable comprising, extruding a first layer of elastomer material on said cable in intimate contact with the surface thereof, the elastomer material having the characteristic of being able to hermetically bond itself one layer upon another, winding upon said first layer at least one reinforcing wire forming coils having a selected spaced relationship, passing said cable with the reinforcing wire wound thereon through a die having a diameter less than the diameter of the cable with the reinforcing wire wound thereon whereby to imbed partially said wire in said first layer and fix said coils in fixed spaced relationship and before passing said cable through said die heating said wire and cable by an electric current thereby to facilitate and improve the embedding of the reinforcing wire, extruding a second layer of elastomer material over said first layer and wire and hermetically bonding said two layers between said spaced coils to form a single sealed envelope hermetically sealing and protecting said reinforcing wire and said cable.

4. The method of protecting and reinforcing an electric cable with a reinforcing wire and a hermetically sealed elastic envelope sealing the wire and the cable comprising, extruding a first layer of elastomer material on said cable in intimate contact with the surface thereof, the elastomer material having the characteristic of being able to molecularly bond itself one layer upon another, winding upon said first layer at least one reinforcing wire forming coils having a selected spaced relationship, and passing said cable and wire through a die to embed partially said wire in said first layer whereby to fix said coils in fixed spaced relationship, and prior to winding said wire on said first layer heating said wire electrically to a selected temperature, extruding a second layer of elastomer material over said first layer and wire and molecularly bonding said two layers between said spaced coils to form a single sealed envelope hermetically sealing and protecting said reinforcing wire and said cable.

References Cited in the file of this patent

UNITED STATES PATENTS

| Number | Name | Date |
|---|---|---|
| 802,159 | Dykes | Oct. 17, 1905 |
| 1,993,526 | Rihl | Mar. 5, 1935 |
| 2,018,230 | Robertson | Oct. 22, 1935 |
| 2,138,378 | Johnson | Nov. 29, 1938 |
| 2,181,475 | Bourdon | Nov. 28, 1939 |
| 2,239,408 | Wallace | Apr. 22, 1941 |
| 2,287,947 | Shoemaker | June 30, 1942 |
| 2,455,773 | Johnson | Dec. 7, 1948 |
| 2,576,227 | Hutchins | Nov. 27, 1951 |
| 2,586,345 | King | Feb. 19, 1952 |
| 2,647,072 | Smith | July 28, 1953 |